May 10, 1932.   J. H. E. BAKER ET AL   1,857,833
AUTOMATIC OR SEMIAUTOMATIC TELEPHONE SYSTEM
Filed Dec. 19, 1929     9 Sheets-Sheet 1
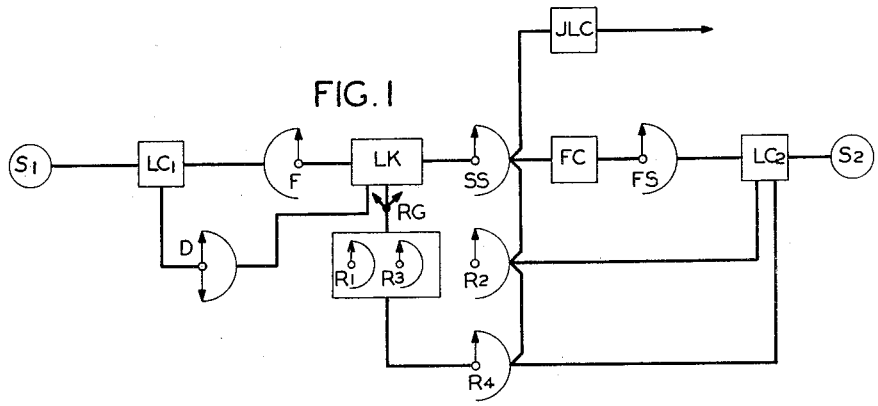
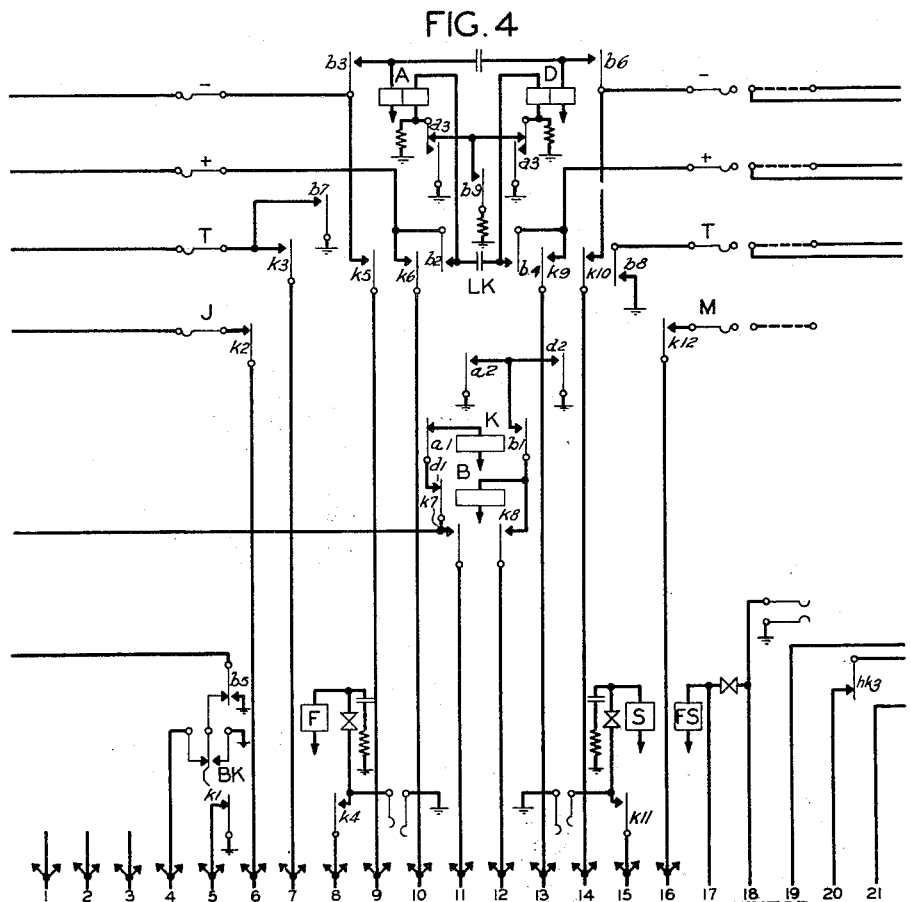
INVENTOR
JOHN H.E. BAKER
LESLIE B. HAIGH
BY
ATTORNEY May 10, 1932.   J. H. E. BAKER ET AL   1,857,833
AUTOMATIC OR SEMIAUTOMATIC TELEPHONE SYSTEM
Filed Dec. 19, 1929   9 Sheets-Sheet 2
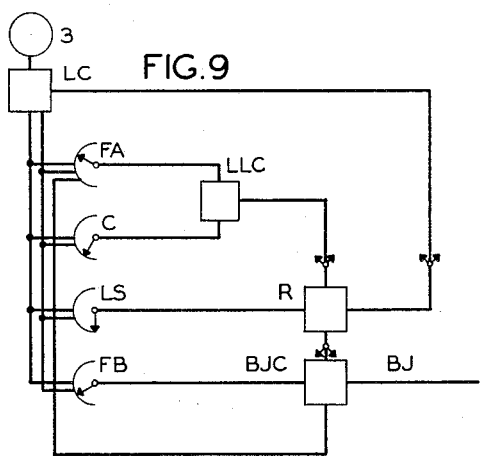
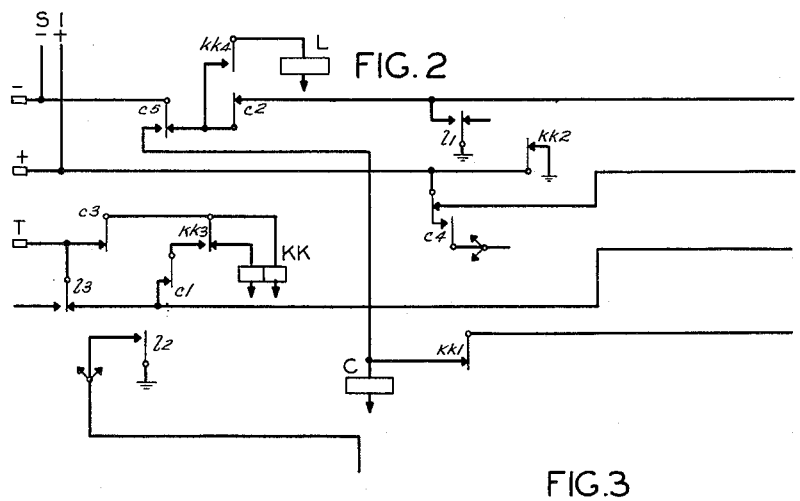
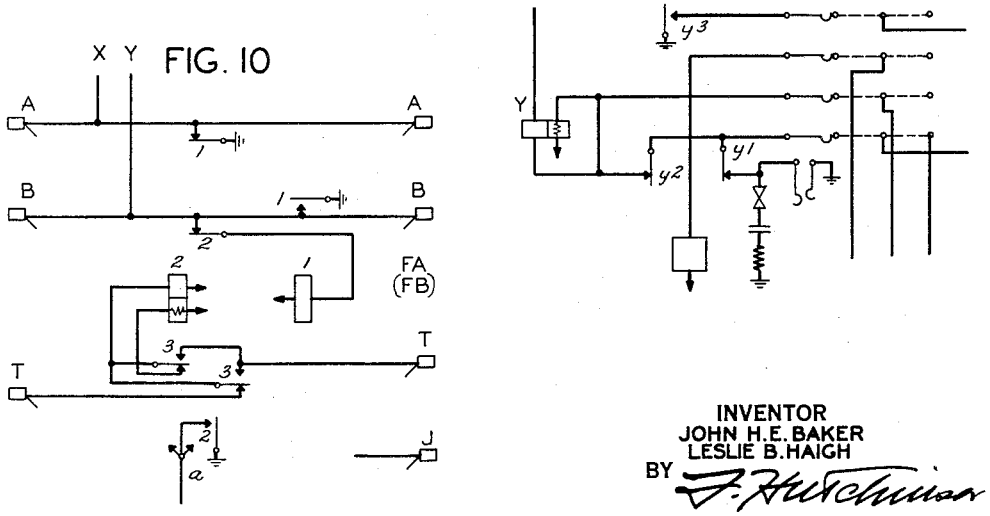
INVENTOR
JOHN H.E.BAKER
LESLIE B. HAIGH
BY
ATTORNEY

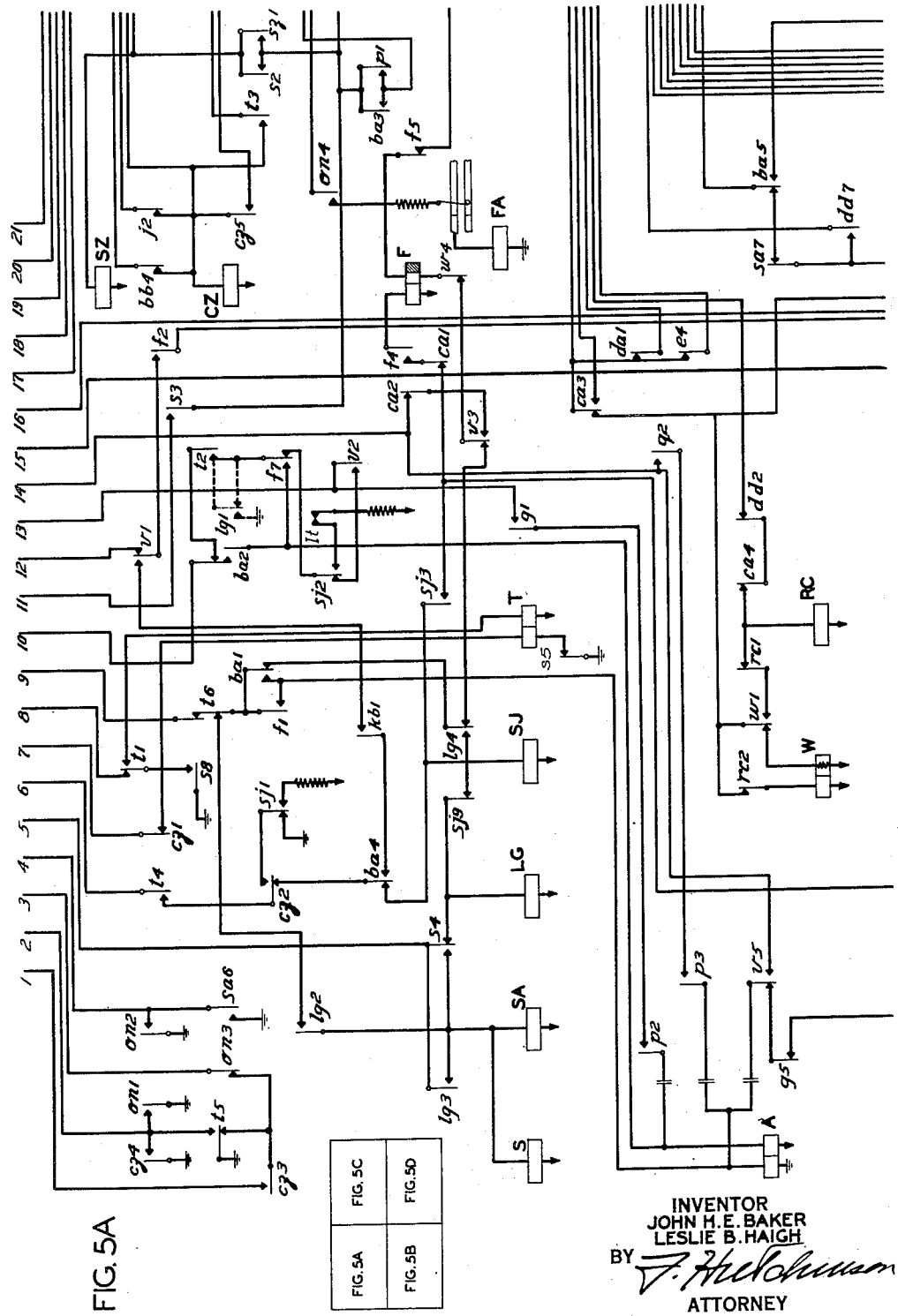

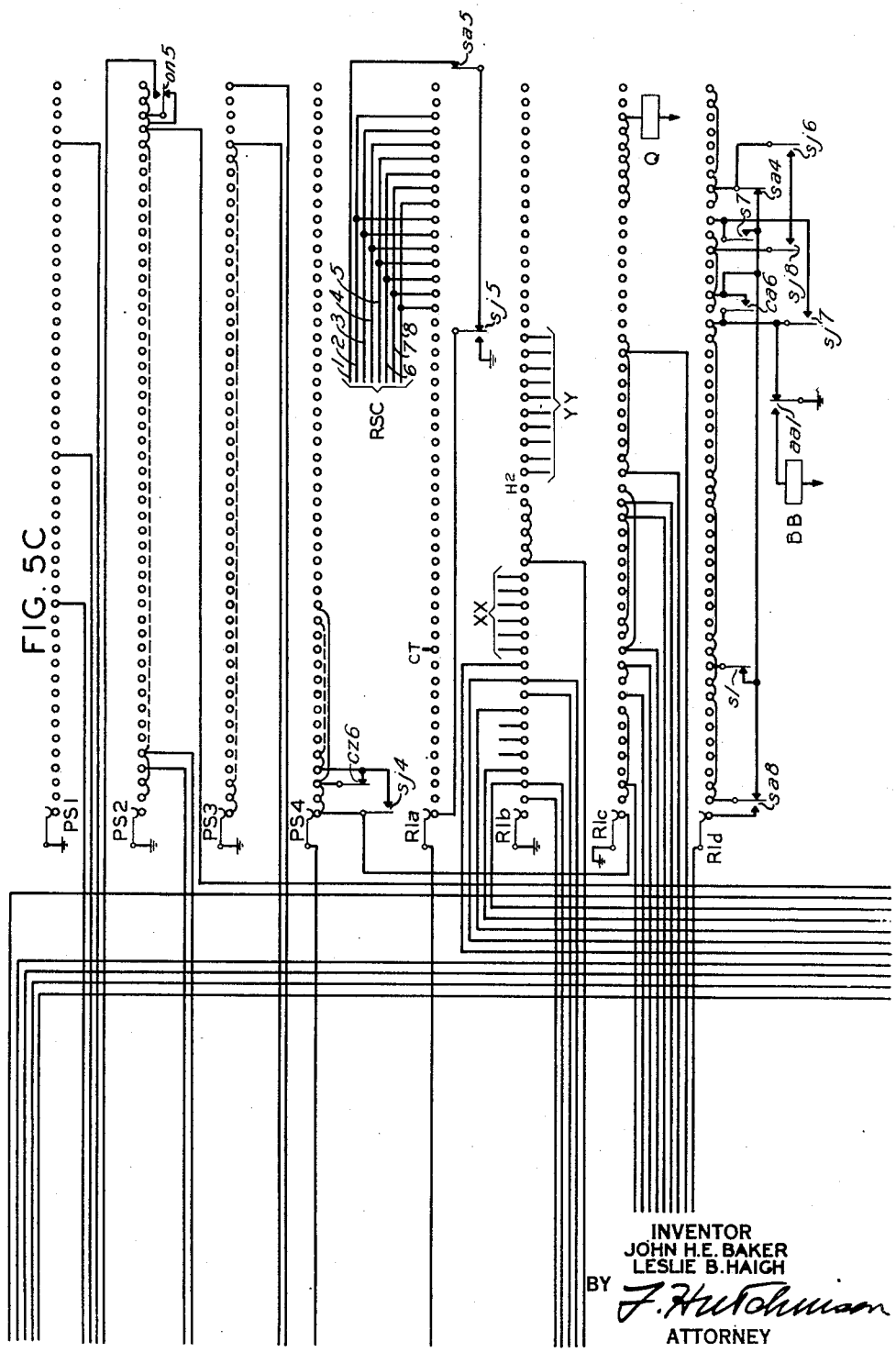

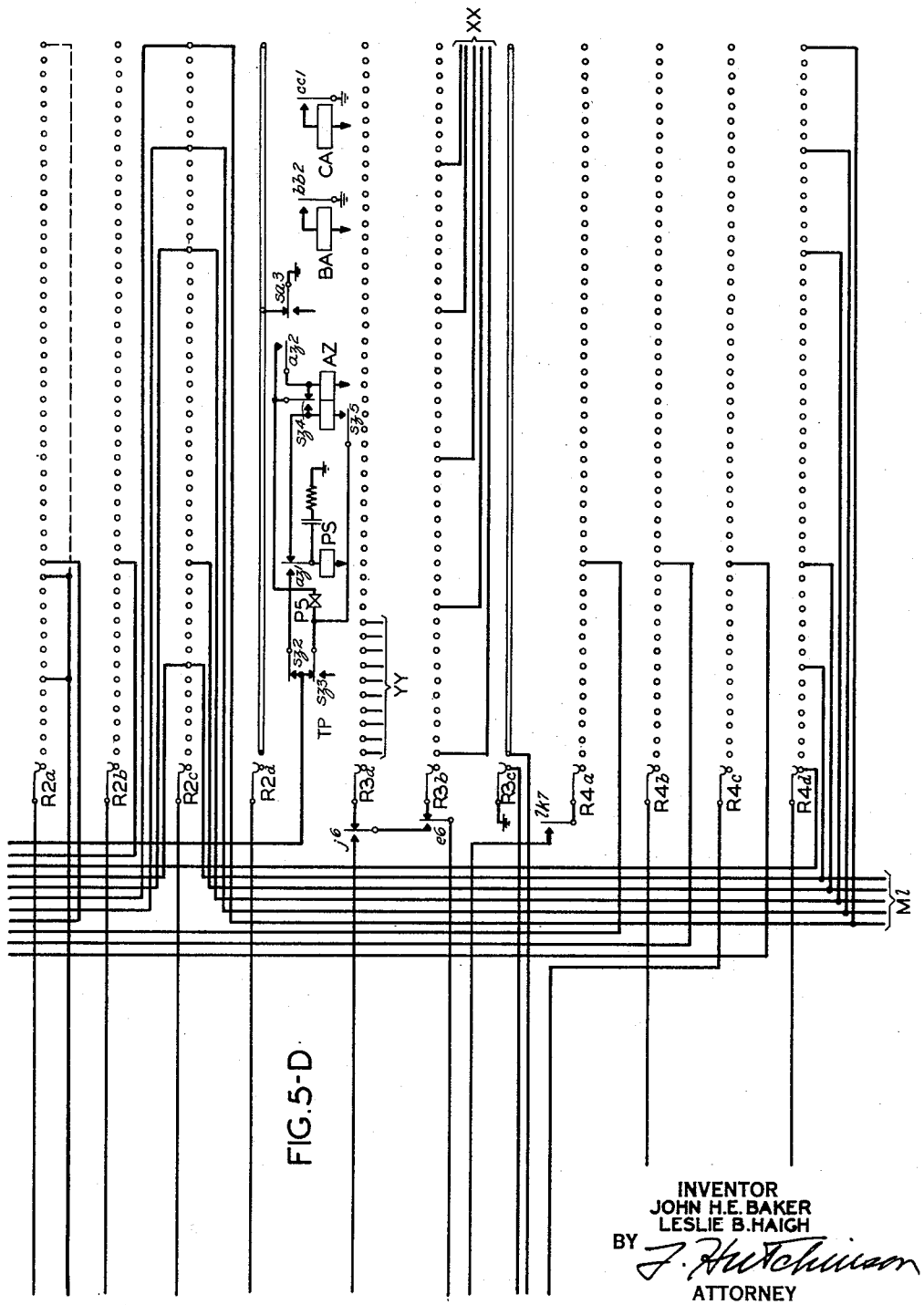

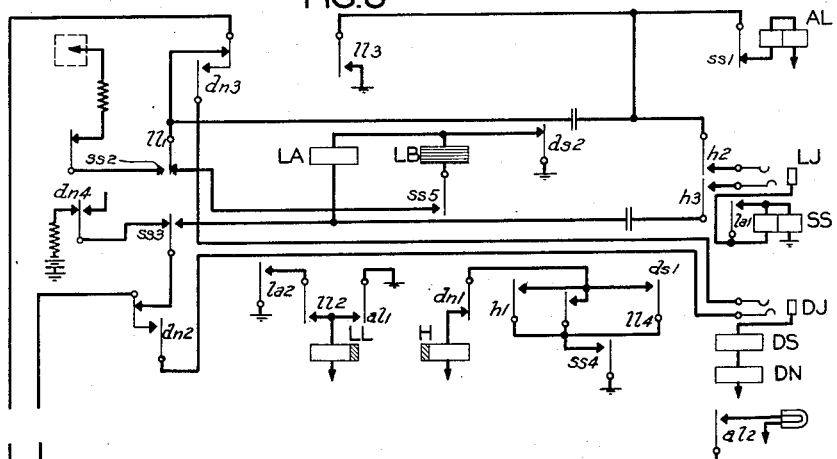
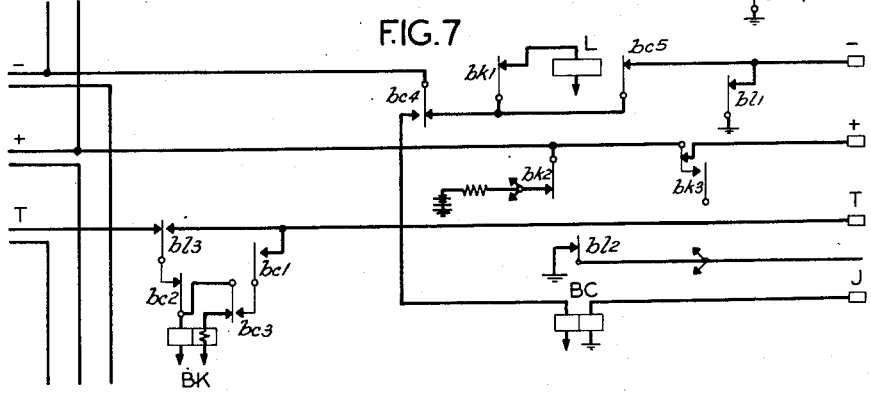
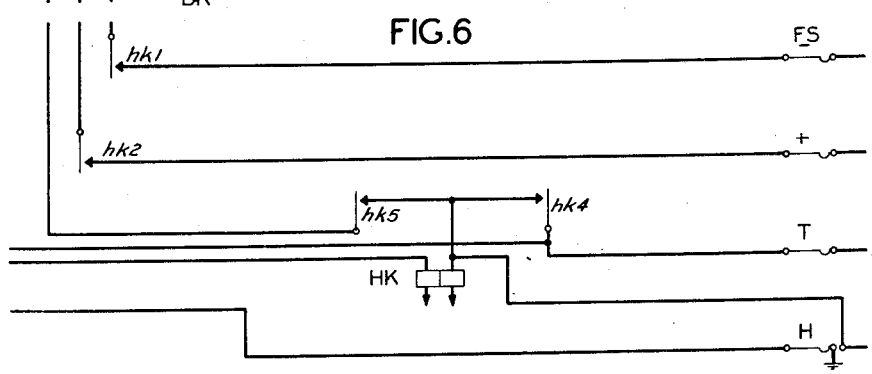

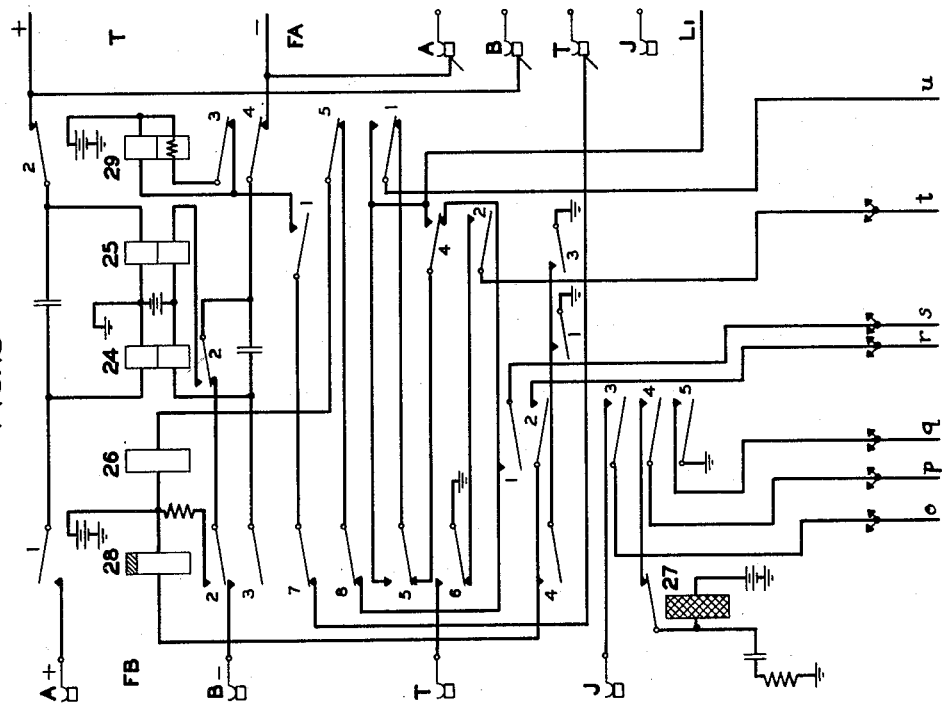
FIG.13
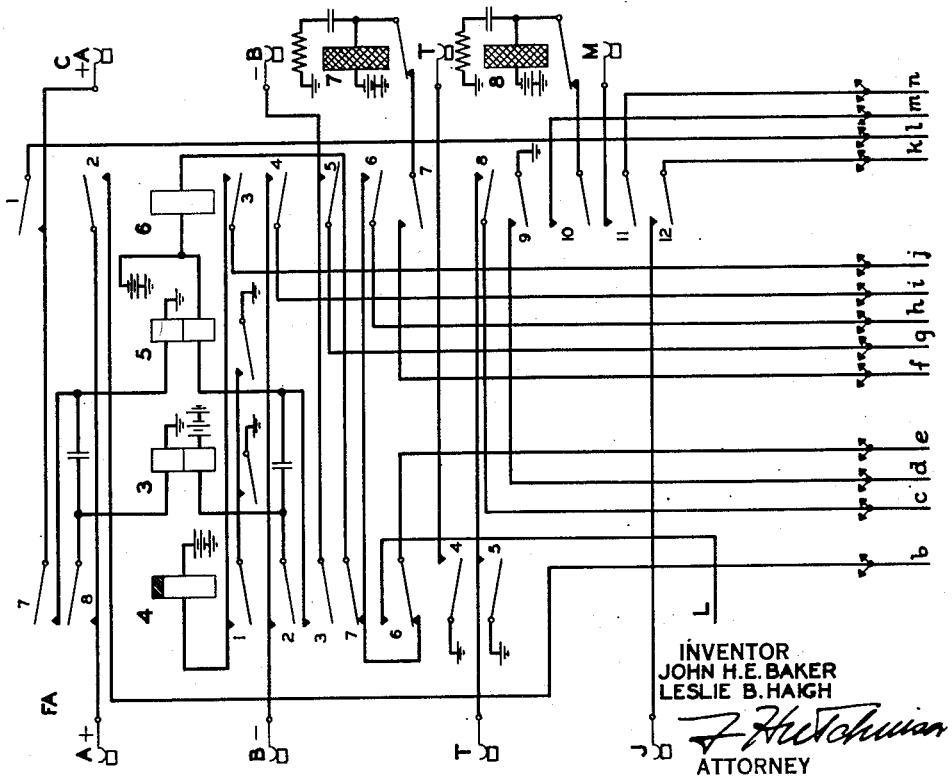
FIG.11
INVENTOR
JOHN H.E. BAKER
LESLIE B. HAIGH
ATTORNEY

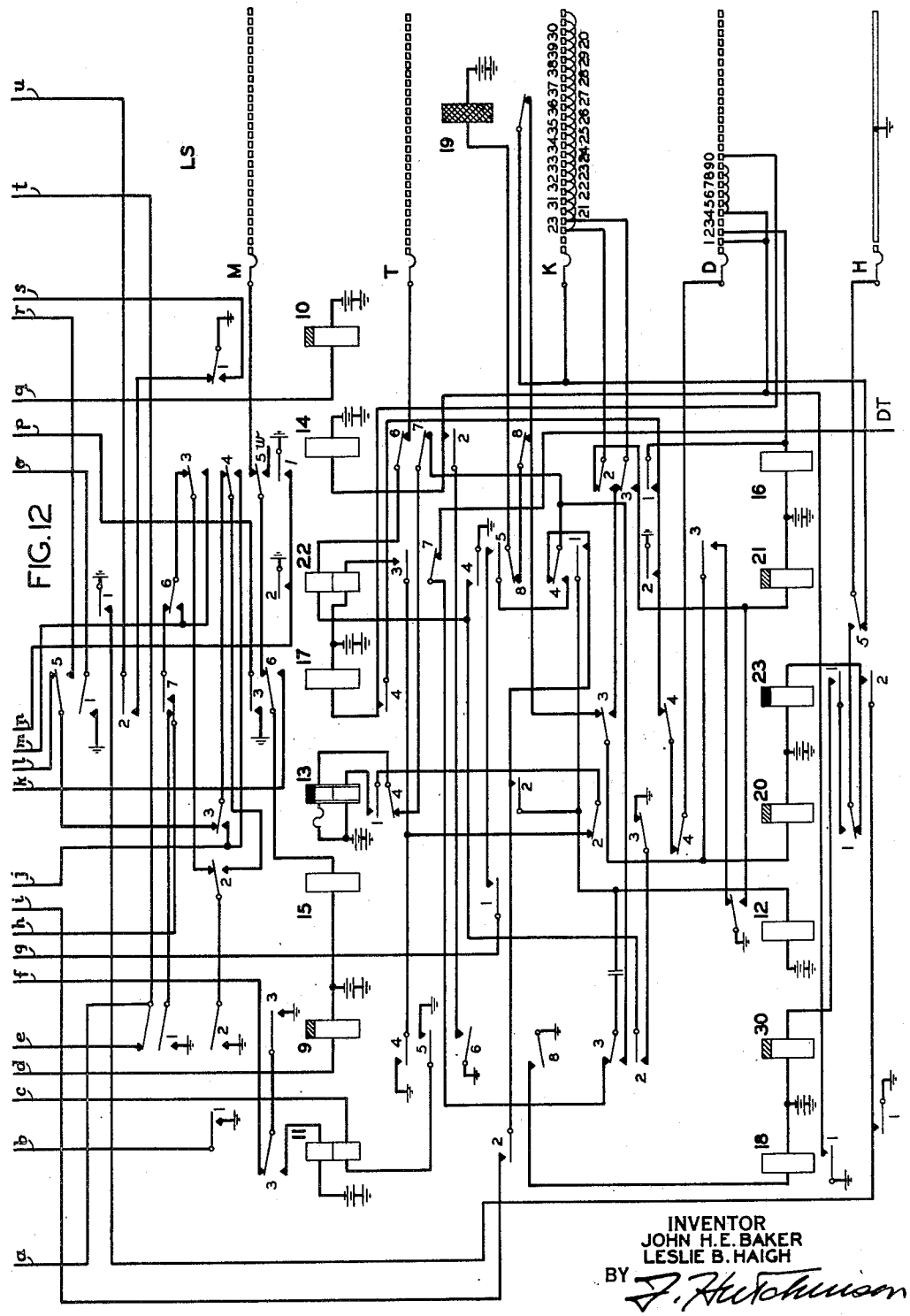

Patented May 10, 1932

1,857,833

UNITED STATES PATENT OFFICE

JOHN HENRY ELVIDGE BAKER AND LESLIE BAINES HAIGH, OF ALDWYCH, LONDON, ENGLAND, ASSIGNORS TO INTERNATIONAL STANDARD ELECTRIC CORPORATION, OF NEW YORK, N. Y.

AUTOMATIC OR SEMIAUTOMATIC TELEPHONE SYSTEM

Application filed December 19, 1929, Serial No. 415,203, and in Great Britain December 20, 1928.

This invention relates to telephone systems of the type in which connections are extended from one line to another by means of automatic switches.

More particularly the invention is concerned with telephone exchanges of the rural type in which the subscribers are located at considerable distances from each other and in which the number of calls arising in any particular area is very small.

The object of the invention is to provide an improved system of this type in which all apparatus expensive to construct and maintain is reduced to a minimum but in which the subscribers are still provided with a system in which calls may be made with the same accuracy and rapidity as before.

In order to obtain this object the switching arrangements which require to be used throughout conversation are made as simple as possible and as much of the apparatus as possible is located in a common control circuit which is only employed for setting up a connection and is then released for controlling another call. This common control circuit is not only common to a number of different switching arrangements but is also adapted to control the operation of apparatus located at a plurality of different switching stages.

According to one feature of the invention a connection is set up over a plurality of selector switches whose movements are controlled by a common registering mechanism in such a way that a selector switch at one stage is controlled by the common register over a path different from that over which connection is extended to such selector switch by a selector switch at a preceding switching stage.

According to the preferred arrangement the selector switch at the preceding stage is moved into a position determined by the setting of the common register so as to be set on to an outlet leading to the required selector switch at the next stage, which latter switch co-operates with a switch forming part of the common register in such a way that the two switches are moved in synchronism with each other whereby the selector switch is set to a position determined by the setting of the common register.

By means of the invention the common register is adapted to test for an idle outlet leading from one switching stage and also to test the condition of a line accessible from a succeeding switching stage. These two testing operations may conveniently be brought about by means of a common relay located in the registering and controlling mechanisms.

According to a further feature of the invention, a circuit arrangement is provided for setting up connections in automatic or semi-automatic telephone systems in which, after a call is initiated, ringing current is sent back over the calling line from the automatic equipment as soon as such equipment is in a condition to deal with a call.

Preferably the connection is extended under the control of a registering mechanism and if the calling subscriber hangs up after initiating a call, ringing current is transmitted over the calling line from the registering mechanism, as soon as such mechanism is in a condition to receive controlling impulses.

According to a further feature of the invention in a telephone system in which connections are extended automatically under the control of a registering mechanism, the line relay of a calling line is locked up upon the initiation of a call and remains locked up until the connection with the registering mechanism is completed.

According to a further feature of the invention, a circuit arrangement is provided for establishing connections in a telephone system over one of a plurality of similar switching arrangements each of which is provided with means which in the event of a connection being extended to a busy switching arrangement is adapted to extend such connection to another switching arrangement which repeats the operation until an idle switching arrangement is found.

By means of the equipment employed in the invention, a common registering mechanism is provided for controlling the other portions of the automatic equipment such as the link and final circuits, and by this arrangement the register contains all the apparatus necessary for the setting up of a call and is taken into use for that period only while the other portions of the equipment contain only the apparatus used during the conversation. It will be seen, therefore, that by this invention a very economical arrangement is provided particularly for rural equipments, since the greater part of the apparatus is located in the common register which is only used for setting up a call and is then released, whereas the other portions of the equipment which must necessarily be employed throughout the conversation are made in the simplest possible manner.

In automatic telephone systems there is a time interval between the moment of initiating a call and the moment when the number should be dialled and it is usual to provide dial tone to inform the calling subscriber that dialling may be commenced.

With the system, according to the present invention, the waiting time may be rather greater due to only one register being provided for every group of lines. In order to counter-balance this disadvantage, arrangements are made whereby the calling party can hang up after originating a call and the register will transmit ringing current to such party when it becomes free. Should the calling party fail to respond to the ringing signal, after a predetermined interval, the apparatus will return to normal as if no call has been made.

The invention will be more completely understood from the following detailed description which is given in conjunction with the accompanying drawings in which Fig. 1 represents diagrammatically the lay-out of the invention.

Fig. 2 shows a line circuit such as may be seized upon a calling subscriber initiating a call.

Fig. 3 shows the circuit of a distributor switch.

Fig. 4 shows a link circuit.

Figs. 5A, 5B, 5C and 5D show a register, a common control circuit.

Fig. 6 shows a final selector circuit.

Fig. 7 shows a junction line circuit and

Fig. 8 shows a manual end circuit.

Figure 5B:
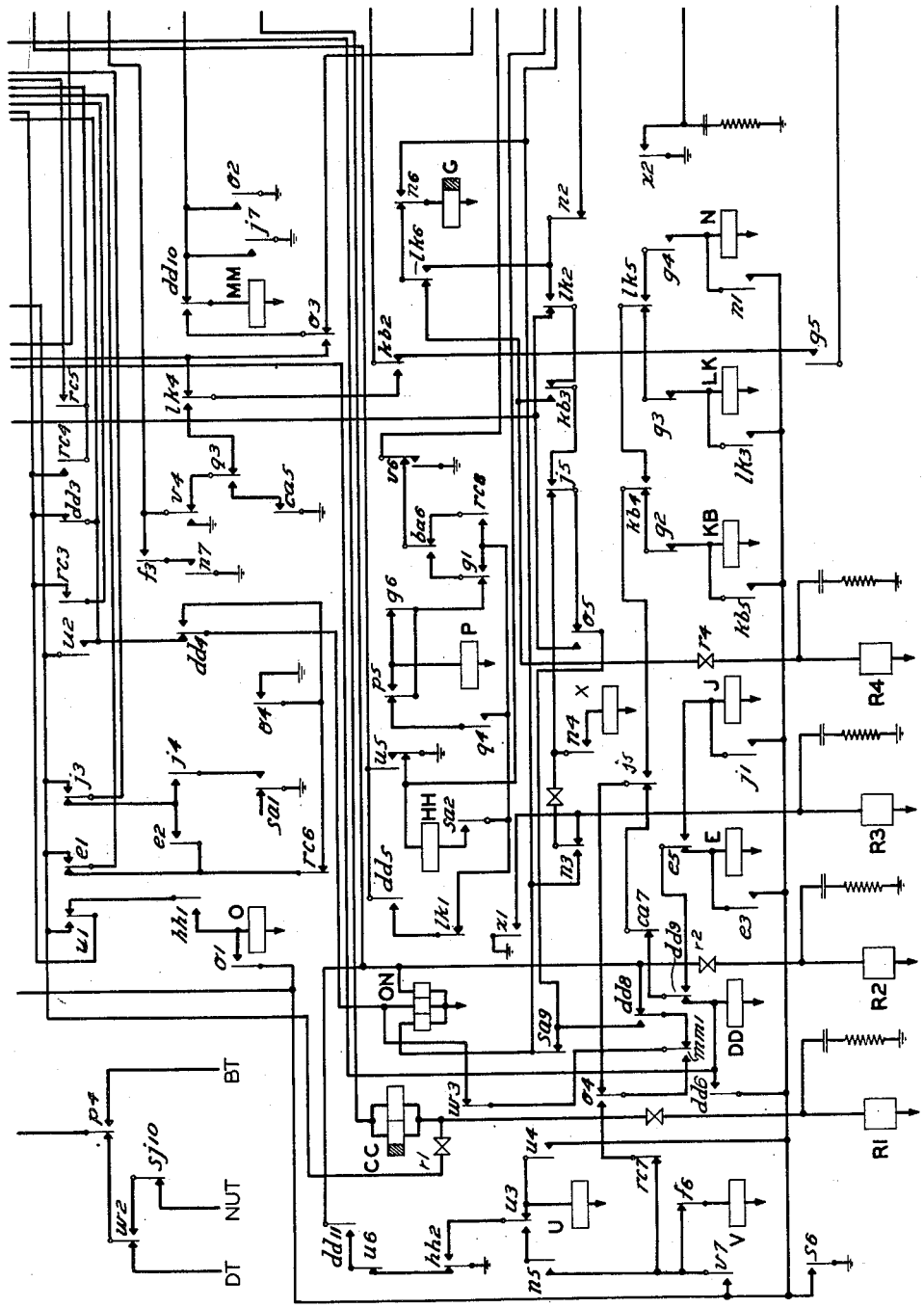

The remainder of the drawings illustrate a modified form of the invention and of these Fig. 9 shows diagrammatically a layout of the modified system.

Fig. 10 shows a line circuit arranged according to the modification of the invention.

Fig. 11 shows a local link circuit.

Fig. 12 shows a register circuit and

Fig. 13 shows a junction circuit which is designed to operate in both directions, that is to say, both for outgoing and incoming calls.

Referring now to these drawings, Fig. 1 shows diagrammatically the switching scheme of the system. All subscribers and junction lines terminate in a line circuit $LC_1$ or $LC_2$ consisting of a line relay, a cut off relay, and a fault relay. Two switching stages are employed; a selector SS which is positioned in accordance with the first or 100's digit, and a final selector FS which is positioned in accordance with the 10's and units digits. All the final selectors are accessible from the banks of the group selectors.

The subscriber's lines appear in a multiple on the banks of both finders F final selectors FS and the junction lines on the banks of both finders F and group selectors SS.

Each combination of finder and group selector is associated with a link circuit LK, consisting of four relays, which controls the conversation. The final selector is associated with a single holding relay, all its operations being controlled from the register RG. This holding relay and the drive magnet of the final selector are denoted by FC. The holding relay is controlled over the switch R2 whilst the final selector switch is controlled over the switch R4. The register is common to a group of link circuits and is connected to one link circuit at a time by a relay of association in the link circuit. A register is provided for each group of link circuits but is accessible to every line circuit.

The register contains all the apparatus required for setting up the call and controls the entire process until conversation conditions are established.

Referring to Fig. 1 the sequence of events in the establishing of a local connection is as follows:

The subscriber S1 on calling, operates the line relay in his line circuit LC, and the distributor D associated with his group of line circuits selects a free link circuit LK, the register RG controlling which is also free. The distributor D then causes the relay of association to operate, thereby connecting the link circuit LK to the register RG, and the register causes the finder F to hunt for the calling line. When it is found, the distributor D is stepped off the link circuit concerned and preselects a free link circuit and a register in readiness for the next call.

The calling party S1 now receives dial tone and proceeds to dial the required number. The register consists of four recording switches R1, R2, R3, R4. The banks of the R1 switch shown in Fig. 5C are provided with a plurality of home positions which divide up the banks into four different groups. All the digits are received on the R1 switch and a different group is employed for the reception of each different digit.

The banks of the R2 switch are divided into a number of groups as will be seen from Fig. 5D, and the R1 and R2 switches cooperate with one another in such a way that when the R1 switch is positioned by the first digit, the third wiper of the R2 switch, namely, R2c, is steered on to the first contact of the appropriate group of outlets leading to a final selector FS, or a junction line circuit JLC. When the first digit is concluded, the R2 switch hunts in the selected group for a free final selector, an overflow contact being provided between each group in the case of no free outlet being present.

The banks of the R3 switch are divided up into groups of 10 contacts each and on the receipt of the second digit by R1, the R3 switch is set on to the beginning of a group of 10 contacts determined by the position of the R1 switch and on the receipt of the third digit, the R3 switch is set on to a contact in the selected group corresponding with the wanted subscriber's number (S2).

The last digit is received on the R1 switch and serves to select the required ringing code.

It will be seen from Fig. 5D that the contacts of the marking bank R4d of the switch R3 are multipled to the third bank (R2c) of the R2 switch. These contacts are also multipled to the selector switch SS so that after the reception of the third digit, the R4 switch and the selector switch SS of the link circuit are brought into line with the R2 switch so that all three switches R2, R4, SS, are standing on the outlet to the same final selector FS. The selector switch SS is thus positioned ready for the conversation while the R2 and R4 switches serve to extend the necessary controlling leads to the final selector.

The process of setting the final selector switch FS consists in driving it to the home position and subsequently stepping it out, and stepping R3 home simultaneously, the two switches being stepped together from the same relay.

When the R3 switch reaches the home position, the final switch FS will be on the required line and the test of the subscriber's line can be made.

Ringing of the required code is sent from the register RG and when the wanted party S2 replies, ringing is tripped and the register disconnects itself from the conversational circuits, having first caused the operation of the calling party's meter.

At the conclusion of the conversation when both parties restore their receivers, the controlling relays of the link circuit LK restore and release the hold relay of the final selector FS, both link and final selectors are then free for the next call.

The use of common registers is especially economical since all the apparatus for the handling of party lines and such complications can be accommodated in the register leaving the conversational circuits in their simplest form. It will be realized also that in this system the circuits which are required in relatively large numbers are extremely simple. It will be realized however, that the use of these common registers implies the possibility of more or less considerable waiting periods if all available registers are in use at the moment of the originating call. With the low calling rates occuring in rural working, this drawback should not be at all serious, but to cater for the cases of delay which may arise, the line circuits are arranged to lock in the calling condition. The calling subscriber can then institute a call and if he does not receive dial tone almost at once, he may restore his receiver. The first register to become free, will then cause the finder to hunt for and pick up his line, and having done so will send out a special ringing code consisting of a series of dots.

When the subscriber reloops, ringing will be tripped and the dialling condition established at once.

The equipment is arranged so that by moving one wire, the register will hold off the dial tone and the practice of replacing the receiver and waiting for the recall can be made compulsory on every call.

In the case of party line calls, a subscriber on a party line wishing to ring another subscriber on the same line, loops the line, and seizes the register RG, in the standard manner. He then dials 9 plus the ringing code digit of the wanted party and restores his receiver. The register RG drives the link circuit selector switch SS on to a dead outlet and sends the required ringing code back over the finders to the calling line. When the ringing is tripped the register clears down and operates a relay of the link circuit. Conversation then takes place, the signalling being controlled from the link circuit LK.

In the case of a call to the associated main exchange the subscriber dials "0". This will cause the register R2 switch to hunt for a free outgoing junction line circuit JLC instead of for a free final. The ringing current will be sent down the negative line and will cause the operation of a calling relay at the distant office. This relay will return a condition which causes the ringing to trip and the register will disconnect itself. When the operator replies, conversation takes place through the link circuit.

If the operator wishes to originate a call she plugs in to the outgoing line jack and as soon as a register is available and has found the junction concerned, she will receive a flicker on her cord circuit supervisory lamp. She will then plug into the dialling jack and dial the required number, the digits of which are effective in the register in the same way as in a local call. If the wanted party is busy and the call is of sufficient importance, the operator may offer the call on receiving busy tone by dialling an additional seven. This will enable her to enter the conversation and if the call is accepted then when both subscribers restore their receivers, the wanted party will be automatically rung without further dialling by the operator.

A delayed alarm circuit is incorporated in the register to deal with any faults which may arise either on the board itself or through the subscriber. The switch of the delayed alarm circuit is operated by a 3 sec. earth pulse as soon as a subscriber institutes a call.

The progress of a normal call is divided into four stages viz., finding of calling line; tripping recall ringing; dialling; ringing. If these stages are not completed within a certain definite period to each stage then the delayed alarm comes into action. Thus if the line is not found in 6 secs. the register and link circuits are released and the distributor forced on to the next free combination. Thus a faulty finder will not prevent service being given to any group of lines.

If the dialling stage is not completed in 72 secs. then the register and link circuits are released and the fault relay of the calling line locked to the loop. If ringing is not tripped in about 2 minutes, release occurs in the same way.

If any of the conditions in which the register is not held from the subscribers loop i. e., ring back and revertive ringing, persist for more than the allotted time, the register and link circuits are forcibly released.

The setting up of a local call will now be described in detail.

The calling subscriber lifts his receiver and energizes L Fig. 2 of his line circuit over $kk4$, $c5$, negative wire the subscriber's instrument loop, positive wire to ground on $kk2$. L locks independent of the loop at $l1$. The start ground from $l2$ is extended to the distributor which is standing on a free link circuit, relay Y of the distributor is energized through both of its coils in series, and the ground on $y3$ completes the operating circuit for K Fig. 4 of the link over $a1$, $d1$, $y3$. K operating closes the circuit for relay LG (Fig. 5A) from battery relay LG, $s4$, conductor 5, $k1$ to ground. LG is used to prevent ringing being sent out before the subscriber's cut off relay KK has had time to operate. LG completes an operating circuit for relay S of the register over $lg3$ to ground at $k1$ (Fig. 4), which then locks over $s4$ Fig. 5A and closes the circuit of relay SA which is a relief relay to S. When relay S operates the locking circuit for relay LG is over $s4$, $lg2$, $t6$, $ba1$, $lg4$, $sj9$. The link and register are now definitely associated together. The link finder hunts for the calling line which has battery on the test wire the driving circuit for magnet F being through $k4$, conductor 8, $t1$, $s8$ to ground.

When this line is found T (Fig. 5A) operates from battery on test wire via both coils of relay KK Fig. 2 in parallel, $c3$, $l3$, T contact and wiper, $k3$, conductor 7, $ca1$, left hand winding of relay T, $s5$ to ground. T operates and opens the circuit of the drive magnet F and closes a locking circuit for itself at $t1$. The subscribers cut-off relay KK (Fig. 2) pulls up in series with T and locks over $c1$ and $kk3$. The circuit for the line relay L is opened at $kk4$ and the relay relapses and relay Y in the distributor circuit (Fig. 3) is released at $l2$. Relay K in the link circuit however is locked over $a1$, $d1$, $k7$, conductor 11, $s3$, bank PS4, Fig. 5C bank R1$c$ to ground. When Y in the distributor relapses a circuit is closed for the drive magnet thereof from ground $sa6$, conductor 4, key BK, $b5$, $y1$, interrupter springs, magnet of the distributor to ground. This distributor steps on to the next free register and link circuit in readiness for the next call. The conductors 3 from all of the registers are connected to the last contact in the banks of all the distributors and normally a ground is connected thereto from $t5$ over $on3$ of all the registers and a hunting distributor will therefore be drawn over this position. However, if all the registers are busy a ground will not be encountered on this contact and the distributor will therefore be held up until a register becomes free. LG falls back when contact $t6$ operates. Ringing is now sent to the calling line from the ringing source RCS1 over $sa5$, $sj5$, contact and wiper R1$a$, $f5$, right hand coil of relay F, $w4$, $v3$, $lg4$, $ba1$, $t6$, conductor 9, $k5$, $c2$, $c5$, subscribers negative line, bell, and positive line, $c4$, $k6$, conductor 10, $ba2$, $t2$, $f7$, $sj2$, to ringing return battery. Relay F will not operate until the calling party answers, whereupon it will lock over its left hand coil, $f4$, $ca1$, $to$ the ground on $s6$. If the recall feature is optional the operation is as described above, but if it is compulsory the dotted contact $lg1$ and connections are inserted. In this case if the subscriber does not restore his receiver after operating a call relay LG is locked up over the subscribers loop when relay T operates from battery relay LG, $sj9$, $lg4$, $ba1$, $t6$, conductor 9, $k5$, $c2$, $c5$, subscriber's loop $c4$, $k6$, conductor 10, $ba2$, $t2$, $lg1$, to ground. Relay LG will therefore not relapse until the subscriber restores his receiver.

Relay AA of the register is now brought into circuit direct across the calling line and operates over both its windings from ground left hand winding AA, $f1$, $t6$, conductor 9, $k5$, subscriber's loop $k6$, conductor 10, $ba2$, $t2$, $f7$, right hand coil of relay AA to battery. AA energizes BB Fig. 5C at $aa1$ which in turn operates BA Fig. 5D at $bb2$. At $ba1$ Fig. 5A an alternative circuit for the left hand coil of AA is closed, and the circuit for LG is definitely opened. Dial tone is now sent down the calling line from the source DT Fig. 5B over $w2$, $p4$, $q5$, $v5$, condenser, $ba1$, $t6$, to the calling line. The subscriber now dials and the impulse relay AA responds.

Relay BB is slow acting and is not effected by the rapid breaking of AA.

R1 steps for all dialled impulses.

For the 1st digit R1 steps one for each impulse over the circuit from battery, magnet RI, winding of CC, *ba*5, wiper and contact R1*d*, *sa*8, *aa*1, to ground. When the switch R1 is stepped off its home position the impulsing circuit is closed independently of *sa*8. During the reception of impulses relay CC operates and operates CA at *cc*1. The circuit for relay F is opened at *ca*1. Switch R2 follows R1 over the circuit from battery, magnet R2, interrupter springs *r*2, *dd*8, *mm*1, *w*3, *dd*4, *dd*7, to ground on wiper R1*c*, but is not allowed to get beyond the beginning of the group corresponding to the contact on which R1 is resting. The stepping of R2 is under the control of relay MM which operates when R2 reaches the beginning of the group of final selectors corresponding to the contact on which R1 is standing over the following circuit battery relay MM, *dd*10, wiper R2C, contact and wiper R1*b* to ground. At the end of the digit with relays MM and AA permanently operated the circuit of relay CC is opened at *aa*1 and relay DD operates over the circuit, battery DD, *dd*9, *ca*7, *j*5, *o*4, *mm*1, *w*3, *dd*4, *dd*7, to ground on wiper R1*c*. DD operates and locks over *dd*6 to ground on *s*6. The circuit for MM is opened at *dd*10. With DD operated RI stops to its ninth contact over a circuit from battery magnet R1 interrupter springs *r*1, *dd*7, arc and wiper R1*a* to ground.

R2 hunts for a free final selector in the required group over a circuit from battery magnet R2, interrupter springs *r*2, *dd*11, *u*6, *hh*2 to ground. A free final selector is characterized by having battery on the test wire. Relay HH operates when one is found from ground at *u*5, winding of relay HH, *sa*2, *lk*1, *dd*5, wiper and bank of R2*a*, conductor such as 20 *hk*3, to battery through the left hand non-inductive coil of relay HK of the free final selector (Fig. 6), and stops the drive of R2 at contacts *hh*2. If no finals are available R2 steps to the last position of a group where ground is put over *u*5, winding of HH, *sa*2, *lk*1, *dd*5, wiper and contact R2*a*, *rc*2, left hand winding of W to battery. W operates and number unobtainable tone is given to the calling subscriber from source NUT over *sj*10, *w*2, *p*4, *q*5, *v*5, condenser, *ba*1, *t*6, conductor 9, *k*5 to line. Likewise the terminals in R2*a* corresponding to groups of finals which are not used, are connected to the conductor leading to relay W so that if a subscriber dials a wrong first digit he receives number unobtainable tone. When a free final is found U operates to ground on *hh*2 over *u*3 and locks to *s*6 over *u*4. At *u*5 a ground is placed over the wiper R2*a* and conductor 20 to render the final selector busy to other registers. It will be seen that relay HH will be short circuited by the ground from *u*5 on one side and the ground on bank R3*c* in its home position on the other side and will therefore relapse, and similar relays in other searching registers will be short circuited by the ground on *u*5. When relay U operates the switch R1 is driven to its second home position H1 over contacts *u*2 and *u*1.

For the 2nd digit R1 steps for each impulse as before and R3 follows R1 under the control of MM over the circuit from battery magnet R3, *n*3, interrupter springs *r*3, *j*5, *o*5, *dd*8, *mm*1, *w*3, *dd*4, *rc*6, *e*1, to ground on R1*c* wiper. When wiper R3*c* leaves its home position the short circuit is removed from relay HH. The wires XX from the bank R1*b* are connected to the wires XX on the bank R3*b*, and it will be seen, therefore, that for each step of switch R1, R3 has to make ten steps to encounter the marked group. When the switch R3 encounters the marked group relay MM is operated at *mm*1 the circuit for magnet R3 is opened. The circuit for relay MM is as follows from battery MM, *dd*10, *o*3, *e*6, wiper and contact R*b*3, one of the XX wires, contact and wiper R1*b* to ground. At the end of the digit with R3 at the beginning of the correct group, and CA back, relay E operates over *e*5, *dd*9, *ca*7, *j*5, *o*4, *mm*1, *w*3, *dd*4, *rc*6, *e*1, wiper R1*c* to ground, locks to *s*6, and R1 runs to its 3rd home position H2 over its interrupter springs *r*1, *e*1, bank R1*c* to ground, and MM relapses.

For the 3rd digit R1 steps as before and R3 follows R1 over a circuit from battery R3, *n*3, interrupter springs *r*3, *j*5, *o*5, *dd*8, *mm*1, *w*3, *dd*4, *rc*6, *e*2, *j*3, wiper RIC to ground. The wires YY on bank R3*a* are multipled to each tens group on the bank and are connected to the third position YY on bank R1*b*. When wiper R3*a* meets the terminal on which the wiper R1*b* is standing, relay MM operates over *j*6 and *e*6 and opens the circuit for the magnet R3 at *mm*1.

At the end of the digit with R3 resting on the terminals equivalent of the tens and units digits dialled, J operates over *e*5 and the operating circuit for E, and locks to *s*6 over *e*3. With J up, R1 runs to its 4th home position H3 over a circuit from battery magnet R1, interrupter springs *r*1, *j*3, contact wiper R1*c* to ground, and is ready to absorb the final ringing digit. MM relapses. With J up R4, which is a relief switch to R2, hunts over *kb*3, *j*5, *o*5, *dd*8, *mm*1, *w*3, *dd*4, *rc*6, *e*2, *j*4, *sa*1 to ground. Relay G operates in parallel with the magnet R4 over *lk*6 and *n*6. When the switch R4 finds the same position as R2 ground on *j*7 is extended over wiper and contact R2*c*, one of the leads M1, contact and wiper R4*d*, *g*5, *kb*2, *j*6, *e*6, *o*3, *dd*10, relay MM to battery. The drive of magnet R4 is opened at *mm*1. Relay G is slow to release and holds on for a while after the circuit for R4 is opened.

With relays MM and G up, KB operates over $g2$, $kb4$, and operating circuit of J and locks to ground on $s6$ over $kb5$. Relay G relapses after this circuit has been established.

Immediately relay KB operates the circuit of relay MM is opened at $kb2$, and the relay relapses whilst its circuit is transferred over $lk4$, conductor 16, $k12$, (Fig. 4), to the marking wiper M of the selector switch SS.

All of the terminals in the banks R2c and R4d of the switches R2 and R4 (Fig. 5D) are connected to corresponding terminals in the marking bank M of the selector switch SS (Fig. 4) over the conductors designated M1.

When KB operates a circuit is closed for the magnet S of the switch SS (Fig. 4) from battery magnet S and its interrupter springs, $k11$, conductor 15, $lk2$, $kb3$, $j5$, $o5$, $dd8$, $mm1$, $w3$, $dd4$, $re6$, $e2$, $j4$, $sa1$ to ground.

Immediately the wiper M encounters the terminal in its bank marked from bank R2c, ground on $j7$ over one of the leads M1 operates relay MM opening the circuit for the magnet S at $mm1$, and closing a circuit for relay LK over $o4$, $j5$, $kb4$, $lk5$, $g3$.

Relay LK opens the circuit of relay MM at $lk4$ which relay relapses.

The final selector (Fig. 6) is now tested to see if it is home. If it is not home it is driven there under the control of MM over its interrupter springs, conductor 18 R4c, bank, $n2$, $lk2$, $kb3$, $j5$, $o5$, $dd8$, $mm1$, $w3$, $dd4$, $rc6$, $e2$, $j4$, to ground on $sa1$. G operates in parallel over $lk6$ and $n6$. When the final is home MM operates from ground wiper H (Fig. 6) conductor 21 wiper and contact R2b, $r4$, $q3$, $lk4$, $kb2$, $j6$, $e6$, $o3$, $dd10$. The circuit for the magnet FS (Fig. 6) and relay G is opened at $mm1$. With G up and MM up, G being slow to release, N operates over $g4$, $lk5$, and the operating circuit of LK and locks to $s6$ over $n1$. When contacts $n3$ and $n4$ close relay X operates from battery relay X, $n4$, interrupter springs $r3$, $n3$, wiper and homing bank R3c to ground. At $x1$ an obvious circuit is closed for magnet R3 which operates and opens its interrupter springs $r3$, thereby releasing relay X. Thus the magnet R3 is stepped under the control of relay X. At $x2$ a circuit is closed for the magnet FS (Fig. 6) over wiper R4b and conductor 17, which is therefore stepped as long as relay X remains in circuit. Immediately the final selector (Fig. 6) leaves its home position relay MM releases. The circuit for relay G is closed over $n6$ and the bank R3c. The switches R3 and FS (Fig. 6) will step in unison until R3 reaches its home position whereupon relay X relapses. In this position the final selector will be standing on the wanted line.

A test is now made in conjunction with relay G, Fig. 5B during its slow release period, to see if the wanted line is free. If it is free the battery potential on the test wire over both coils of relay KK Fig. 2 in the line circuit, is connected via $c3$, test wiper T, conductor 19, bank R4a, $lk7$, $v6$, $ba6$, $g1$, $sa2$, relay H to ground on bank R3c in its home position. In this case relay V operates over $n5$, $u3$, to ground on $hh2$, locks to ground on $s6$ over $v7$ and at $v4$ closes a circuit for the inductive winding of relay HK Fig. 6 of the final selector from battery right hand coil of relay HK, homing wiper and bank H of the final selector, conductor 21, wiper R2b, $v4$ to ground, and a temporary locking circuit for HK is closed over $v6$, $lk7$, bank R4a, conductor 19, $hk4$. This ground also renders the line busy. The last digit, the ringing digit, is absorbed by R1 switch only which steps over a circuit from battery magnet R1, relay CC, $ba5$, wiper and bank R1d in home position H3, and $aa1$ to ground. Relay CA is operated when CC operates and the circuit for the magnet is completed for the next six contacts over $ca6$. Code ringing is sent over the line from one of the leads RCS2–8, wiper R1a, $f5$, winding of relay F, $w4$, $v3$, $ca2$, conductor 14, $k10$, negative and positive line, $k9$, conductor 13, $v2$, to ringing return battery. When the called subscriber answers F operates, tripping the ringing, V falls back at $f6$ and completes energizing circuit for B of the link over $k8$, conductor 12, $v1$, $f2$, $dd6$ to ground on $s6$. B operates and locks the subscribers' cut off relays and relay HK (Fig. 6) to ground at $b7$, and $b8$ Fig. 4 and renders both lines busy to calling parties. Feeding relays A and D of the link circuit operate to the calling and called subscribers loops respectively when B operates, breaking the circuit of K in the link at $a1$ and $d1$ and locking B over $b1$ to $a2$ and $d2$. Relay K releases and the register is released when S and SA drop back and the switches and relays return to normal. When everything is normal the register is free to deal with another call. Switch R1 returns to normal from the ground on $aa1$ Fig. 5C, $sa8$, $s7$, and $sa4$, bank R1d, $ba5$, $sa7$ and interrupter springs $r1$. R2 returns to normal from ground $sa3$, Fig. 5D bank R2d, interrupter springs $r2$. R3 returns to normal from ground, bank R3c, $sa9$, Fig. 5B, $o5$, $j5$, interrupter springs $r3$, and $n3$. R4 remains in the postion in which it was last set.

When the subscribers release, relays A and D fall back, B releases slowly and the cut off relays are de-energized, while the circuit for the HK relay Fig. 6 of the final selector is broken at $b8$. Link and final circuits are then ready for another call. The selector switch SS is of the non-homing type, and when released remains in the position to which it was last set.

If the wanted line is busy a ground will be found on the test wire which will short circuit relay HH and therefore this relay will not operate. When relay G falls back at the end of its release period relay P operates from the ground on the test wire and at p4 connects a busy tone from the source BT to the negative wire of the calling party.

In the case of a reverting party line call the subscriber after seizing the register in the manner hereinbefore described dials 9 thereby causing R1 to take 9 steps. R2 steps to the last outlet whereupon relay MM operates from R1b wiper, and contact, R2c contact and wiper, dd10, relay MM to battery. Relay DD operates over dd9, ca7, j5, o4, mm1, w3, dd4, dd3, contact and wiper R1c to ground and locks to s6. Before relay DD can operate however, relay RC Fig. 5A will operate over ca4, dd2 bank and wiper R1b to ground, and locks over rc1 to ground on s6. When relay DD operates it releases MM and closes at contacts dd5, a circuit for relay HH from ground, u5, sa2, lk1, dd5, wiper and contact R2a, w1, non-inductive winding of W to battery. The inductive winding of W is disconnected at rc2. The operation of relay HH closes the circuit for relay U at hh2 which locks over u4 to s6, and for relay O from battery relay O, hh1, u1, contact and wiper R1c to ground. Relay O locks to s6 at o1. Relay O performs almost identical functions to those it performs in an O level call, that is to say, it controls the position of the selector in the link circuit in accordance with the position of R2, outlet 49 of the selector is unused. Now when relay U operates, it closes the circuit for driving R1 to the next home position over u1. Since relay RC is up, R1 will move to what is normally the 4th home position, H3 over rc3, rc4, and rc5, it is therefore correctly positioned for receiving the ringing code digit. When this arrives, and the calling party has replaced his receiver to release AA, BB, Ba the required ringing is connected to the final wipers via the circuit before described, and when this ringing is tripped and relay F operates, the register clears down in the regulation manner. Talking battery is fed over relay A in the link.

In the case of a junction call the subscriber lifts his receiver, seizes a link which in turn associates itself with the register just as in the case of a local call. To reach the operator, subscriber dials "0". R1 steps to its 10th position absorbing all impulses. R2 follows R1 in the manner before described until it reaches the last or junction group in bank R2c. Five junctions are provided and are multipled to banks R2 and selector switches. Ground on wiper of R1b is thrown out to the R2c bank and when R2 finds this position, MM operates and steps drive of R2. With MM up, DD operates as for a local call and locks to ground on s6. R2 then proceeds to hunt for an idle junction just as in a local call it hunts for a free final selector. The terminals in the bank R2a representing a junction group are wired to corresponding terminals in the bank T of the selector switch SS. A busy junction is marked by a ground potential on the test terminal T, and a free junction is marked by a battery potential over both cores of BK (Fig. 7). When an idle junction is found, relay HH operates from this battery potential viz R2a wiper, dd5, lk1, sa2, winding of HH, u5 to ground. Relay BK operates in series with HH and at bk1 opens the circuit of the line relay BL, and at bk3 opens the positive wire to the finder F, and at bk2 opens the trickle charging current to be described later. Now R1 is standing in the tenth position. Accordingly when HH operates a circuit is closed via hh1, u1, and R1c for relay O. HH also closes the normal circuit for U over hh2, but since this relay is slow to operate, relay O operates and locks over o1 to ground at s6. At u1 a circuit is closed for the magnet R1 and the switch is stepped to its second home position H1. At u5 the circuit for relay HH is opened and a locking ground is supplied to hold relay BX. Relay O at once completes at o5 a circuit for driving the selector magnet S, and at o2 and o3 prepares a circuit for relay MM over the marking bank in the selector from bank R2c. The selector is thus brought into line with R2, MM operating when the required contact is reached.

With MM operated V operates over f6, rc7, o4, mm1, w3, dd4, to ground on o4 and ringing current is sent down the junction line to operator's position over lead CT bank R1a, f5, relay F, w4, v3, ca2, conductor 14, k10, negative line dn3 (Fig. 8), condenser, ss1 to AL relay in the junction circuit JLC at the manual end. This relay is designed to operate on ringing current and on operating lights the calling lamp on operator's position at al2. Relay AL energizes relay LL at al1 and AL locks to ground over ll3. As soon as LL operates the 24 volt battery on ss2 contact operates relay F of register over the negative line, K10, conductor 14, ca2 v3, w4, ringing relay F to the ringing source CT and ringing is tripped. With F operated, V falls back, and B of the link is energized over k8, conductor 12, v1, f2, dd6 to ground on s6. Relay D of the link then operates from 48 volts on D over b6 and negative line to 24 volt battery on ss2 contact at manual end.

The operator inserts her answering plug, and energizes relay SS from a battery on the sleeve of the answering plug. Relay SS breaks the circuit for AL at ss1 and the line lamp is extinguished. Relay LL drops and the ground from ds2 over the retard coil LB maintains operating circuit of D in the link. With SS operated and LL slow, relay H operates over ss4, ll4, dn1 and locks to ss4 over h1.

At h2 and h3 the operator is connected to the line, and can speak to the calling subscriber by battery connected from the cord circuit.

Supervision is given by means of relay LA at the manual end. During conversation relay A in the link is operated and in consequence direct ground is connected via the winding of D to the positive line. When the calling party restores his receiver, relay A releases and a battery potential is applied to the positive line over contact b9. This potential is such that while not affecting loop control in a local call, it causes relay LA to operate in a manual call. Relay LA short circuits the high resistance winding of the sleeve relay and thereby causes the supervisory lamp of the cord circuit to operate.

In the case of a call outgoing from the manual board, the operator inserts her calling plug in the junction jack LJ. This will operate relay SS and by connecting ground over LB to the negative line will cause relay BL of the line circuit to operate and associate the register with the line over bl2 as in the case of a normal call. When a free register has caused the line to be found, a circuit for relay SJ in the register is completed from battery relay SJ, ba4, cz2, t4, conductor 6, k2 of the link circuit, to wiper J, left hand coil of relay BC (Fig. 7) to ground. Relay SJ operates and locks to s6 over sj3. The register now instead of applying ringing to the negative line applies direct ground via sj5, wiper R1a, f5, and the winding of F. At sj2 the positive line is connected to intermittent battery via the interrupter springs It. This causes relay LA at the manual board to flicker and the consequent flicker on the cord circuit lamp is the signal to the operator that she may commence to dial. She will then plug into the dial jack DJ with her dial plug and this will cause relay DS to operate. DS will remove the ground from relay LA and retard coil LB at ds2 leaving these in series across the positive and negative lines. Relay F will therefore be operated followed by relay AA. When the operator dials relay DN operates with the dial off-normal and transfers the positive and negative lines to the dialling circuit.

The operation of the register is exactly as for a local call. The supervision from the link circuit is as for a call to manual.

Relay H in the manual end circuit (Fig. 8) does not operate until the dial plug has been inserted and relay DS operated whereupon H is operated over ss4, ds1, and dn1, thereby preventing the flicker signal being audible to the calling party at h2 and h3.

Since relay DN only operates when the dial is off normal it will release between digits and the operator may listen for tones, etc., without withdrawing the dial plug. Relay H relapses at dn1 when DN operates, but reoperates when DN relapses in between digits.

In the event of the wanted subscriber being busy at the end of the 3rd digit relay G tests as in a local call finds the line busy and falls back so that with relay LK operated relay P operates over q6, g1, ba6, r6, lk7 to ground on R4a wiper from the test wire of the busy subscriber. With relay P operated, busy tone is given to the operator from the source BT over p4, q5, r5, ba1, t6, k5 to line. To offer the trunk the operator dials the subscriber's ringing code which R1 absorbs, and to cut through to busy subscriber's line she dials "7". R1 steps over a circuit from ground aa1 normal, sj8 and sj7 wiper and contact R1d, ba5, relay CC, magnet R1 to ground. A circuit for relay Q is completed over wiper R1c. With relays Q and P up the subscriber's lines are bridged by condensers over p2, q1 and p3 and q2 and the operator can cut through and talk to the busy subscriber. If the call is accepted both subscribers hang up. When their link circuit is released the ground will be removed from the test wire of the wanted party at b7 or b8 and relay P in the register will release. Relay HH will then operate from the battery on the test wire of the wanted party via wiper R4a, over the circuit p5, q4, sa2, relay HH, u5 to ground. At contact hh2 relay U will be operated and at u3 close the circuit of relay V. At v3 the ringing circuit is closed from one of the leads RCS, wiper R1a, f5, relay F, w4, v3, ca2, conductor 14, k10, to the wanted party's line. The call then proceeds in the manner heretofore described.

The circuit is so arranged that it is impossible for a subscriber to cut through to a busy subscriber's line on receiving busy tone since relay SJ only operates when the wiper J encounters a contact with a ground potential that is, on operators' lines only. If on receiving busy tone the subscriber dials "7", R1 does not step since the stepping circuit of R1 is broken by SJ being back.

Arrangements are provided in the circuit for coping with the following conditions.

(1) Finder not finding calling line due to subscriber's line relay not operating fully or failure of the test relay to stop drive of the finder.

(2) Failure on the part of a subscriber to answer recall on a register becoming free.

(3) Calling subscriber does not dial or does not complete dialling without replacing his receiver, or in the event of a permanent loop condition developing on the line.

(4) Failure on the part of the called subscriber to answer when rung.

(5) Failure of a switch in the register to return to normal after a call has been made.

*Finder not finding calling line*

In a local call subscriber lifts his receiver, seizes a link circuit and associated register operating the S relay. With S operated, relay SZ operates over s2, s3, conductor 11, $k7$ to ground on $y3$ in the distributor (Fig. 3). With relay SZ up, a three second ground pulse is fed to the time pulse switch PS over lead TP, $sz3$ and $sz5$ left hand coil of AZ, $az3$, magnet PS to battery. The wipers PS1 to PS4 are advanced one step. Relay AZ operates its $az4$ contacts and thereby closes a circuit for its right hand coil in series with its left hand coil over $sz4$. The circuit for the magnet PS is opened at $az3$. Relay AZ relapses at the end of the 3 second ground pulse. The switch PS thus steps once every 3 seconds. In this case of finder not finding calling line, relay T is not operated and after 6 seconds ground is supplied over the wiper PS2, $t3$ to operate CZ relay. Relay CZ operates connects a ground to the distributor bank (Fig. 3) from $t5$ over $cz3$ and conductor 1 to the distributor magnet thus stepping the distributor on to another link, thereby releasing K in the link since K is no longer held over PS4 and releasing the register for another call.

Failure to answer recall

When a register becomes free and ringing is sent out to the calling subscriber, the time switch PS steps until it reaches position 15, i. e. allowing nearly 3/4 mins. for the subscriber to answer recall. When this position is reached, relay CZ operates from ground from the wiper PS1 over $bb1$. With relay CZ operated the cut off relay KK is dropped at $cz1$ and when KK drops C relay in the subscriber's line circuit (Fig. 2) operates from ground on $sj1$, $cz2$, $t4$, lead 6, $k2$, $kk1$, to relay C and battery. Relay C at its contacts ensures that everything in the line circuit is restored to normal. The distributor is stepped to next line over $cz3$ thus releasing the relay K in the link and freeing the register for another call.

Calling subscriber does not dial, or a permanent loop condition

In this case up to the point where subscriber should dial, relays are operated as for a local call. The time switch steps until it reaches the 24th position on the bank where the relay J (normally operated at the end of the third digit) back ground is fed over $j2$, to operate relay CZ. With relay CZ operated relay C operates as before and KK being released, locks over the subscriber's loop to ground and disconnects L at $c5$. At $c1$, $c2$, $c3$ and $c4$, the subscriber's line is locked out from seizing a register. Relay CZ at $cz1$ opens the circuit of relays KK and T and connects ground to the distributor bank and the distributor switch Fig. 3 steps once to another free link and as before the register is freed just as if no call had been instituted and can deal with another call.

Failure to subscriber to answer when rung

For this case procedure is as for an ordinary call up to the point where the subscriber is rung. If the called subscriber does not answer by the time the time switch PS reaches its 45th position i. e. after an interval of 2¼ mins., relay CZ is operated and energizes the C relay in the calling subscriber line circuit. The distributor switch steps to another link, and the register is free just as if no call had been made as before described.

Failure of register switches

If when the register is released and the switches R2 and R3 do not return to normal relay ON operates over obvious circuits to the ground on $R2d$ or $R3c$ bank:

At $on1$ and $on2$ the register is rendered busy to the distributor (Fig. 3). At $on3$ the ground from $t6$ on conductor 3 to the ultimate contact of the distributor is opened.

The switch PS will have been advanced a considerable number of steps by this time and when SZ falls back a ground will be connected over wiper PS2, $sz3$, interrupter springs $ps$, $sz4$, to right hand coil of relay AZ to battery. AZ relay operates and at $az1$ applies the ground to the magnet PS which operates and opens its interrupter springs $ps$ thereby dropping AZ. In this manner switch PS is stepped to its 48th contact where the operating ground for AZ is opened at $on5$. However in this position relay SZ is operated over $on5$ from the ground on wiper PS2, and at $sz3$ and $sz5$ connect the relay AZ and magnet PS to the three second time pulse conductor TP which operate as heretofore described.

When the switch PS reaches the 50th position a ground is applied over the wiper PS3, $on4$, to the fuse serving all the magnets in the register which thereupon blows and disconnects battery from the magnets and connects the bus bars shown so that relay FA is operated. Relay FA causes a visual signal to be passed to the manual exchange, but seeing that it forms no part of the present invention it is not described. This precaution is taken to save the magnets becoming burnt out.

Relay ON is operated when the magnets R2 and R3 are being set but has no effect as will easily be seen.

Trickle charging

When a junction line is idle a circuit is closed from the trickle charge circuit at the main office and via $dn4$, (Fig. 8) $ss3$, $dn2$, to the positive line and so over the junction to $bk2$ (Fig. 7), to battery via a protective spool. Thus it is possible to maintain a continuous small charging current.

If desired the protective spool may be replaced by a polarized relay which will introduce additional resistance in the line in the event of an earth fault developing which would otherwise cause undue battery drain.

Each of the circuits shown in Figs. 10, 11 and 13 are designed to work into the register circuit shown in Fig. 12 and the leads extending thereto have been arranged and indicated accordingly.

It is though that the invention will be best understood by considering its operation in a general way from the diagram shown in Fig. 9.

Referring to this figure therefore, when a calling subscriber S initiates a call his line circuit LC extends a connection through the register R to the local link circuit LLC which causes the finder associated switch FA to hunt for the calling line. When one of the hunting switches seize the calling line a ringing signal is sent to the latter. Dialling impulses transmitted from 3 are received by the line selector LS of the register, a bank of which is multipled to a bank of the connector C of the local link circuit LLC which if the wanted line is free completes the connection thereto. The both-way junction circuit BJC is provided for extending calls over a junction and is picked up from the register R in response to certain digits. Incoming calls are received by the both-way junction circuit BJC and are extended through the register R to the local link circuit LLC and then proceed as in the case of a local call.

The operation of the circuit arrangement shown in the Figures 10 to 13 will now be described, first as a local call where Figs. 10, 11 and 12 will be combined, and secondly as a junction call where all of the figures will be combined.

The subscriber's line is connected to the wires X and Y, and when a call is initiated the relay 1 is operated over a circuit including contacts 1 and 2 of relay 2 and the substation loop. Relay 1 locks over its contacts 1 through contact 2 of relay 2, and the subscriber may now restore his receiver until an idle register and link circuit becomes associated with his line whereupon he will receive the ringing signal. At contact 3 of relay 1 the relay 2 is extended to the associated contact in the bank of the line finder FA, whilst at its contacts 2 a circuit is closed for relay 6 in an idle link circuit Fig. 11 from ground contact 2 of relay 1, common lead "a" back contact 7 of relay 9, (Fig. 12) lead "e", normal contact 6 of relay 4, (Fig. 11), back contact 7 of relay 4, relay 6 to battery and ground. Relay 6 operates and at contacts 9 closes a circuit for relay 9 in the register (Fig. 12) over lead "d". At contacts 7 of relay 9 the operating circuit for relay 6 (Fig. 11) is opened but that relay is retained operated over the following circuit: ground contact 1 of relay 9, normal contacts 7 of relay 17, lead "n", contact 6 of relay 6, relay 6 to battery and over the circuit previously traced.

Relay 9 at contacts 3 causes the operation of the magnet 7 (Fig. 11) associated with the line finder switch FA over the following circuit: ground contacts 3 of relay 9, normal contact 3 of relay 11, lead "f", contact 7 of relay 6 (Fig. 11), interrupter springs of magnet 7, magnet 7 to battery and ground. Also at contact 5 of relay 9 a ground is applied through the lower coil of relay 11, lead "c", contact 8 of relay 6 (Fig. 11) to the "T" wiper of the switch FA.

The switch FA advances until its wiper T engages the contact T (Fig. 10) of the calling line whereupon the ground potential applied thereto through the relay 11 (Fig. 12) will pass through the upper high resistance operating coil in parallel with the bottom low resistance coil of relay 2. Relay 2 operates and locks through relay 11 over its contacts 3, whilst relay 11 after being initially operated in series with both coils of relay 2 locks in series with the top coil. At contact 3 of relay 2 the bottom low resistance winding thereof is disconnected from the T wiper of the final switch C to render the associated line busy. Relay 2 at contacts 1 and 2 opens the circuit for relay 1.

Relay 11 locks at its operated contacts 3, disconnects the operating ground from the magnet 7 whilst at its contacts 2 applies a ground over the lead "b", contact 2 of relay 6 (Fig. 11), wiper and contact A to the X wire of the calling subscriber's line, and at its contacts 2 applies a ringing current to the Y wire from ringing source upper coil and contact 4 of relay 13, (Fig. 12), contact 7 of relay 14, normal contact 4 of relay 21, "i" wire, contact 4 of relay 6 (Fig. 11) wiper and contact B (Fig. 10).

It will be noted at this point that the subscriber may replace his receiver after initiating the call as the relay 1 (Fig. 10) is locked, so that in the event of a register or a link circuit not being free there is no necessity for the subscriber to hang on the line to wait for a free circuit. It may be arranged by distributing the lines over line finder banks that any waiting subscriber is not made to wait unduly for a free circuit.

Resuming the consideration of the circuit, the relay 13 is of the usual ringing slow acting type and will only operate after the receiver is removed from the switch-hook in which case it operates and locks over its contacts 1 to the ground on contact 4 of relay 9 over contact 2 of relay 20, and disconnects the ringing from the line at contact 4.

At contacts 2 of relay 13 dial tone is applied to the Y wire, to indicate to the subscriber that he may commence to dial, over the lead DT, contact 7 of the relay 22, normal contact 3 of the relay 22, normal contact 3 of relay 30, and condenser C. Also at this contact battery is connected to the Y wire through the relay 12 which is operated to the ground at contact 1 of relay 11. An obvious circuit is closed for relay 21 at operated contact 1 of relay 12.

The subscriber commences to dial and relay 12 responds to each impulse.

The numbering scheme shown is such that the 20's and 30's are subscribers' lines, and that if "0" is dialled the call is extended to an operator. If any other digit than 2, 3 or 0 is dialled for the first digit the register becomes disconnected in a manner to be subsequently described.

Referring to Figure 12, it will be seen that the relay 14 is connected to contacts 1, 4, 5, 6, 7, 8 and 9, of arc D of the switch LS, whilst contact 2 is connected to relay 16, and contact O is connected to relay 17. Contact 3 is left spare.

Assuming that the tens digit dialled is 2 the relay 12 will respond to two impulses. Relay 21 is slow to release and remains operated during the trains of impulses. At each relapse of relay 12 a circuit is closed for the drive magnet 19 of the switch LS from ground, contact 1 of relay 12 normal, contact 3 of relay 21, contact 3 of relay 23 normal, contacts 8 of relays 14 and 22 in shunt with the magnet interrupter springs, magnet 19, to battery.

Relay 20 is energized in parallel with the magnet 19 and being slow to release remains operated during impulsing. The magnet 19 is stepped twice in accordance with the impulses so that the wipers of the switch LS come to rest on their third contacts.

Relay 20 at its contact 2 opens the locking circuit for relay 13 which relapses.

During the interval between the digits relay 20 relapses and a circuit is closed for relay 15 from ground contact 2 of relay 21, contact 4 of relay 23, contact 4 of relay 20, wiper and contact 2 of arc D, relay 16 to battery and ground. Relay 16 operates and locks over its contacts 1 to the ground on contact 2 of relay 21. Also a circuit is closed for relay 23 from ground over the homing arc and wiper H in off normal position, operated contact 5 of relay 21, normal contact 1 of relay 20, relay 23 to battery and ground. Relay 23 is slow to operate so as to allow relay 16 to operate and lock before its operating circuit is broken at contact 4 of relay 23.

When the next digit is received relay 12 responds to the impulses and the circuit arrangement is such that for each impulse received the switch LS takes two steps as follows—relay 12 relapses in response to the break portion of the impulse and closes a circuit for the magnet 19 from ground, normal contact 1 of relay 12 operated contact 3 of relay 21, operated contact 3 of relay 23, operated contact 2 of relay 16, contact 2 and brush 2 of the arc K, magnet interrupter springs, contacts 8 of relays 14 and 22, magnet 19 to battery and ground, the switch LS thereupon performs one step. When the relay 12 re-operates at the conclusion of the break period a circuit is completed for the magnet 19, from ground operated contact 1 of relay 12, operated contact 3 of relay 16, contact 3 and brush of arc K, contacts 8 of relay 14 and 22, magnet 19 to battery and ground. It will be seen therefore that if 21 is dialled the switch will come to rest on its 5th contact which represents the line numbered 21.

Relay 20 operates in parallel with the magnet 19 as before with the consequence that relay 30 is transiently operated from ground over the homing arc and brush H, operated contact 5 of relay 21, operated contact 1 of relay 20, contact 1 of relay 23, relay 30 to battery and ground. Relay 23 is very slow to release and will not relapse when its circuit is broken at contact 1 of relay 20, but will remain operated until a locking circuit is closed over its contacts 2 to the ground on contact 1 of relay 30. Relay 20 relapses at the end of the impulse train and opens the circuit of relay 30 at its contacts 1, but relay 30 is slow to release and does not relapse immediately.

The condition of the register at this stage is that relays 9, 11, 30, 12, 23, 21 and 16 are operated.

When relay 20 relapses ground is applied from contact 3 of relay 20 contact 2 of relay 30, upper coil of relay 22, contact 6 of relay 14, to the wiper T and thence to the test contact of the called line at the final switch, as represented at "c" on the left of Fig. 10, through both coils of relay 2 in parallel to battery. Relays 2 and 22 operate in this circuit, relay 2 at its contact 3 opens the circuit of its low resistance winding to render the seized line busy to any other searching final switches. The relay 22 will only operate to the battery supplied over both coils of relay 2 in parallel, but after being saturated will remain operated over its contacts 4 in series with the high resistance coil of that relay. Relay 30 now relapses, but the circuit for relay 23 is completed as before.

The contacts of the marking bank "M" of the switch "LS" in the register (Fig. 12), are wired individually to contacts in the marking bank M of the switch "C" in the link circuit (Fig. 11), so that the operation of the latter switch may be controlled according to line selected by the switch LS. When the switch LS has selected a line a battery potential is applied to the selected "M" terminal thereof over the relay 15, normal contacts 6 of relay 17, normal contacts 5 of relay 14.

When relay 22 in the register operated a circuit was completed for the magnet 8 of the switch "C" in the link circuit (Fig. 11) from ground contact 2 of relay 9, normal contact 2 of relay 15, normal contact 3 of relay 14, operated contact 6 of relay 22, lead "M", contact 10 of relay 6 (Fig. 11), interrupter springs of magnet 8, magnet 8 to battery and ground.

The switch C (Fig. 11) advances under the control of its interrupter springs and when its wiper "M" reaches the contact marked by the switch LS a circuit is completed for the relay 15 in the register (Fig. 12) from ground contact 2 of relay 22 in the register, lead "n", contact 11 of relay 6 and wiper and contact "M" of the switch C (Fig. 11), contact and wiper n of the switch LS.

Relay 15 operates and at its contacts 2 disconnects the circuit of the magnet 8 and connects ground from contact 2 of relay 9 to the positive wiper of the switch C (Fig. 11) and thence to the "A" wire of the called line over normal contact 4 of relay 14, normal contact 3 of relay 13, normal contact 5 of relay 17, lead "l", contact 1 of relay 6. This ground supplies a return path for the ringing current which is now being sent over the "B" wire of the called line from, ringing source in the register, upper coil and contact 4 of relay 13, contact 7 of relay 14, operated contact 4 of relay 21, contact 5 of relay 22, contact 1 of relay 15, lead "g", contact 5 of relay 6 (Fig. 11), negative wiper and contact of switch "C". Ringing tone is applied to the calling subscriber through the condenser C.

Relay 13 energizes when the called subscriber answers, and locks as before, and at its contact 3 transfers the ground from the A wire to the relay 4 (Fig. 11) which operates over the following circuit: ground and battery, relay 4, contact 3 of relay 6, lead "j", operated contact 3 of relay 13 normal contact 4 of relay 14.

Relay 4 at its contacts 9 and 2 extends the calling subscriber's loop over the A and B wires and switch FA to the relay 3 which operates and locks relay 4, whilst at contacts 7 and 3 of relay 4 and A and B wires of the called subscriber are extended over the switch C to the relay 5 which operates and provides a further locking circuit for relay 4. This arrangement provides for last party release.

At contact 7 of relay 4 the circuit for relay 6 is opened which relay relapses, and at contacts 6 of relay 4 the start wire "a" from the register is transferred over the lead "L" to the next idle link circuit. At contacts 4 of relay 4 a ground is applied to the test contact T of the final switch C to hold relay 2 of the called subscriber, when the register is released, whilst at contact 5 a ground is extended over the wiper and contact T of the switch FA to hold the relay 2 of the calling subscriber.

On the release of relay 6 the relays, 9, 11, 15, 13, 22, 12, 21, 16 and 23 in the register are released, and a homing circuit is provided for the switch LS from ground, homing arc and wiper, normal contact 5 of relay 21, magnet interrupter springs, contacts 8 of relays 14 and 22, magnet 19 to battery. The switch will be thereupon stepped to its home position.

If the tens digit 3 is dialled the operations are exactly similar except that relay 16 (Fig. 12) is not operated, and the stepping of the switch LS in accordance with the units digits impulses is performed over the normal contacts of that relay.

If an operator is required, the register and the local link circuit will be picked up and the line finder FA (Figs. 10 and 11) will find the calling line as hereinbefore described. When the first digit is dialled however, which in this case will be "0", the switch LS in the register (Fig. 12) will be stepped to its tenth position whereupon the relay 17 will be operated from the ground at contact 2 of relay 21, contacts 4 of relays 23 and 20, D wiper in its tenth position, relay 17 to battery and ground. Relay 17 locks over its contact 4 to the ground on contact 2 of relay 21, and at contacts 7 transfers the holding circuit of relay 6 (Fig. 11) from contact 1 to contact 2 of relay 9 over normal contact 2 of relay 15, normal contact 3 of relay 14, normal contact 6 of relay 22. Relay 17 at its contacts 2 closes a circuit for the relay 26 in first idle junction circuit (Fig. 13) from ground normal contacts 1 of relay 10, contact 2 of relay 17, lead "u", normal contact 1 of relay 29 (Fig. 13), normal contact 5 of relay 28, normal contact 4 of relay 25, contact 8 of relay 28, contact 5 of relay 29, relay 26 to battery and ground. It will be seen that if either of the relays 29, 28 or 25 are operated due to the junction circuit being busy the start lead "u" is extended to the next idle junction circuit over the lead L1. Relay 26 at contacts 5 closes the circuit for relay 10 (Fig. 12) over the lead "q", which relay operates and closes a locking circuit for relay 26 (Fig. 13).

When the relays 6 and 17 (Fig. 12) operated the relay 15 (Fig. 12) was connected to the junction brush "J" of the link circuit (Fig. 11) over operated contact 6 of relay 17, lead k, and contact 12 of relay 6.

The bank of the switch FA in the link circuit (Fig. 11) is multiplied to the bank of the switch FB in the junction circuit (Fig. 13).

When the relay 26 (Fig. 13) operated a circuit was closed for the magnet 27 of the switch FB (Fig. 11) from ground and battery, magnet 27, interrupter springs thereof contact 4 of relay 26, lead "p", contact 3 of relay 17 (Fig. 12) to ground. The switch FB thereupon advances under the control of its interrupter springs until its wiper "J" meets the terminal marked by the wiper "J" of the local link circuit whereupon relay 15 in the register (Fig. 12) is operated from ground contact 1 of relay 17, lead "*o*", contact 3 of relay 26 (Fig. 13) to brush and contact "J" of the switch FB, and thence over the circuit already described.

Relay 15 at its contacts 2 closes a circuit for relay 28 in the junction circuit (Fig. 13) from ground contact 2 of relay 9, operated contact 2 of relay 15, normal contact of relay 4, normal contact 3 of relay 13, operated contact 5 of relay 17, lead "*r*", contact 2 of relay 26 (Fig. 13) relay 28 to battery and ground. Also at this contact of relay 15 the holding circuit for relay 6 in the local link circuit (Fig. 11) is broken and that relay relapses disconnecting the link circuit from the register and releasing the relays therein as heretofore described. Relay 10 therein however is still locked from contact 5 of relay 26 over the lead "*q*".

Relay 28 at its contacts 1 and 3 extends the subscriber's loop from the positive and negative wiper of the switch FB to the relay 24 which operates, whilst at its contacts 2 applies a resistance battery over normal contact 2 of relay 24, and contact 4 of relay 29 to the negative wire of the junction T to the wanted exchange to operate the operator's signalling equipment thereat. Relay 24 provided a locking circuit at its contacts 1 for relay 28, whilst at its contacts 2 replaces the resistance battery on the negative wire by the lower coil of relay 25. Also relay 28 at its contacts 8 opens the circuit of the relay 26 which relapses and disconnects the register from the junction circuit. The circuit for the relay 10 in the register is opened at contacts 5 of relay 26, and that relay slowly relapses.

The operator at the wanted exchange on observing the calling signal inserts a plug or otherwise answers the call and causes the operation of relay 25 which at its contact 3 closes a further locking circuit for relay 28 so that in the event of the operator wishing to hold the connection the relay 25 will be held over its upper coil.

On the total release of the connection relays 24 and 25 will relapse thereby releasing relay 28 and restoring the circuit to normal.

In the case of an incoming call over the junction T (Fig. 13) a battery potential is placed over the positive wire, contact 2 of relay 29 to the upper coil of relay 25. A circuit is therefore closed for relay 6 in a local link circuit from ground normal contact 6 of relay 28, contact 2 of relay 25, wire "*t*", contact 7 of relay 9 (Fig. 12), lead "*e*", over the previously traced circuit to relay 6. The subsequent operations are exactly as heretofore described.

The relay 29 (Fig. 13) is connected to the test contact T in the bank of the switch FA, over contact 1 of relay 25 and 7 of relay 28, and when the wipers of the switch find this marked contact the relay 29 is operated from the ground over the lower coil of relay 11 in the register (Fig. 12) and locks as before explained.

At contacts 2 and 4 the + and − wires of the junction T are disconnected from the junction circuit arrangement, and at contact 5 the operating circuit of relay 26 is disconnected whilst at contacts 1 the next idle junction circuit is prepared, there is no possibility of interrupting the connection.

The operator will receive dialling tone and dial accordingly and consequently set up a train of connections in an exactly similar manner as heretofore described in connection with a local call.

Means are provided in this arrangement wherein a forced release of the register is accomplished if it is not released within a certain time or if a wrong number is dialled, and a tone signal is sent to the calling subscriber. The feature is also used to indicate that the called subscriber is busy or is not at home.

The thermal device 18 and the relay 14 are combined to produce this feature. If the register is held for longer than a certain period due to the calling subscriber not dialling or the called subscriber not answering the contact 1 of the thermal device 18 closes, or if the subscriber dials a wrong tens digit, that is, 1, 4, 5, 6, 7, 8 or 9, the relay 14 will be operated over obvious circuits and will lock over its contacts 2 either to contact 6 of relay 9 or to the ground at contact 1 of the thermal device 18.

The lead "*w*" shown at the operated contact 5 of relay 14 is connected to a contact in the bank "M" of the switch C (Fig. 11) and connected to the corresponding positive and negative contacts in a suitable tone.

Therefore when the relay 14 (Fig. 12) operates a circuit is completed for the magnet 8 of the switch "C" (Fig. 11) from ground contact 2 of relay 9, normal contact 2 of relay 15, operated contact 3 of relay 14, lead "*m*", contact 10 of relay 6 (Fig. 11) magnet interrupter springs, magnet 8 to battery and ground.

The switch C (Fig. 11) advances until it meets the marked "M" terminal whereupon a circuit is closed for relay 15 (Fig. 12) from ground contact 1 of relay 14, lead "*n*" contact 11 of relay 6 (Fig. 11) wiper and contact M of the switch "C", operated contact 5 of relay 14 (Fig. 12) normal contact 6 of relay 17, relay 15 to battery and ground. Relay 15 at contact 2 opens the circuit of the magnet 8 and connects the ground from contacts 2 of relay 9, over operated contacts 4 of relay 14, lead "J" to the relay 4 (Fig. 11) as heretofore described. Relay 4 operates and at contacts 2 and 8 connects the subscriber's loop to the relay 3 and applies the tone to the calling subscriber from the contacts of the switch "C", besides which it causes the release of the register circuit (Fig. 12) as before described.

It is to be noted that any of the numbers 1, 4, 5, 6, 7, 8 or 9 can be used as a discriminating digit to gain access to a further similar small rural exchange, in which case a discriminating relay, such as the junction relay 17, would be added in the register for each exchange.

What is claimed is:

1. In a telephone system, a calling line, a line relay associated with said calling line, means for automatically locking said line relay in its operated position on the initiation of a call, means for connecting earth potential to a registering mechanism common to a plurality of calling lines, means for causing a finder switch associated with said common registering mechanism to hunt for said calling line, and means for transmitting a ringing signal to said calling line upon a connection between such line, and said common registering mechanism being completed.

2. A telephone system comprising a registering and controlling mechanism and a plurality of switching stages adapted to be controlled by said mechanism wherein said mechanism is adapted to control the selective operation of a selector switch at one switching stage and also directly to control the stepping operation of the driving magnet of a switch at a succeeding switching stage without the use of any control relays associated with the switch at the succeeding stage.

3. An automatic telephone installation comprising a calling line, a line relay therefor, automatic switches and a switch controlling mechanism, wherein said relay is adapted to be locked up on the initiation of a call on said line, enabling the calling party to hang up without breaking down the connection thus far established if said controlling mechanism is not then accessible and means adapted automatically to signal the calling subscriber upon the said controlling mechanism becoming accessible to said line.

4. An automatic telephone system comprising a calling line, automatic switches, switch controlling mechanism and means adapted to maintain said line in a calling condition after the initiation of a call over said line and a subsequent interruption or termination of the initiating operation on the part of the calling subscriber, until said switch controlling mechanism is in a condition to handle the call.

5. A telephone system comprising a registering mechanism, a train of automatic selector switches adapted to be controlled by said registering mechanism, a switching device in said mechanism which is set by impulses from a calling line, a second switching device in said registering mechanism adapted to be controlled by said first switching device to select a group of selector switches in said train of automatic selector switches, means for causing said switching device to hunt for a free switch in the selected group, and means for moving said free switch in synchronism with said first mentioned switching device in said register to connect with the wanted line.

6. In a telephone system, calling lines, a link circuit common to a plurality of said calling lines, means for extending a line to the link circuit, a registering mechanism common to a plurality of link circuits, means for connecting said link circuit to said registering mechanism, a plurality of selective switching stages, means for setting a switching device of said registering mechanism on to an outlet leading to a required group of selector switches, means for causing said switching device to hunt for an idle one of said selector switches in the group, means for setting a selector switch at a previous switching stage in accordance with the setting of said switching device in said register thereby establishing a connection between said link circuit and said idle selector switch at said next switching stage, and a control circuit independent of said connection for setting said idle selector switch at said next switching stage in accordance with the setting of another switching device in said register previously set in accordance with the wanted designation.

7. An automatic telephone exchange installation comprising automatic switches, a switch controlling mechanism common to said automatic switches, a plurality of subscribers' lines, means for maintaining said lines in a calling condition after the receiver is restored if the said controlling mechanism is busy when a call is made and means for transmitting a ringing signal to a calling subscriber automatically when said switch controlling mechanism is free to receive the call of the said subscriber.

8. A telephone system comprising a plurality of selective stages each comprising a plurality of selector switches, a registering and controlling mechanism common to the switches of said selective stages and adapted to control said switches, means under control of said mechanism, for extending a connection from a switch at one selective stage to a switch at a succeeding selective stage and means whereby said selector switch at the succeeding stage is adapted to be controlled by said mechanism over a control circuit independent of the connection between said selector switch and a selector switch at a preceding switching stage.

9. A telephone system comprising a plurality of selective stages each comprising a plurality of selector switches, a registering and controlling mechanism common to the switches of said selective stages and adapted to control said switches, means whereby the said mechanism is adapted to control the setting of said switches over one path and means under control of said mechanism for subsequently completing a different path over the same switches for talking purposes.

10. A telephone system comprising sequentially arranged selector switches, a controlling mechanism common to said switches, means whereby the controlling mechanism is adapted to control the movement of the switches at different stages in the sequence and a testing device in said controlling mechanism adapted to test for an idle outlet leading from one switch in the sequence to another and also to test the condition of a line accessible from a succeeding switch.

11. A telephone system comprising a train of automatic selector switches, a registering and controlling mechanism common to and adapted to control said switches, a switch in said mechanism adapted to respond to dialled impulses and to control the selection of a free selector switch in said train of switches, means whereby upon such selection being effected another selector switch at a previous stage in the train is adapted to be automatically set under control of said switch in said mechanism to establish a direct connection between said last mentioned selector switch and said free selector switch at the next switching stage and a control circuit between said free selector switch and said mechanism independent of said direct connection.

12. A telephone system comprising a registering mechanism, a switch in said mechanism responsive to dialled impulses, a train of automatic selector switches adapted to be controlled by said mechanism, and means whereby said switch after being set onto a terminal corresponding to the wanted designation is adapted to be stepped home in synchronism with a selector switch in said train which thereby extends a connection to the wanted line.

13. A telephone system comprising a registering mechanism, a switch in said mechanism responsive to dialled impulses, a train of automatic selector switches adapted to be controlled by said mechanism, and means whereby said switch after being set onto a terminal corresponding to the wanted designation is adapted to be stepped home in synchronism with a selector switch in said train which thereby extends a connection to the wanted line and means associated with said mechanism for selecting and transmitting a ringing code to said line.

14. In a telephone system the combination of a plurality of selector switches each having a single relay and a driving magnet, a controlling mechanism common to said switches, means for establishing a control circuit between the driving magnet of one of said switches and said common controlling mechanism and means for operating the relay to establish a talking connection over the switch independent of said control circuit.

In witness whereof we hereunto subscribe our names this twenty-seventh and thirtieth days of November, 1929, respectively.

JOHN HENRY ELVIDGE BAKER.
LESLIE BAINES HAIGH.